(12) United States Patent
Jang et al.

(10) Patent No.: US 9,293,963 B2
(45) Date of Patent: Mar. 22, 2016

(54) FAN MOTOR

(71) Applicant: NEW MOTECH CO., LTD., Gwangju (KR)

(72) Inventors: Jeong Cheol Jang, Gwangju (KR); Gyeong Su Park, Gwangju (KR)

(73) Assignee: NEW MOTECH CO., LTD., Gwangju (KR)

( * ) Notice: Subject to any disclaimer, the term of this patent is extended or adjusted under 35 U.S.C. 154(b) by 254 days.

(21) Appl. No.: 14/344,321

(22) PCT Filed: Oct. 17, 2012

(86) PCT No.: PCT/KR2012/008455
§ 371 (c)(1),
(2) Date: Mar. 12, 2014

(87) PCT Pub. No.: WO2013/069904
PCT Pub. Date: May 16, 2013

(65) Prior Publication Data
US 2014/0246936 A1    Sep. 4, 2014

(30) Foreign Application Priority Data
Nov. 8, 2011    (KR) .................. 10-2011-0115945

(51) Int. Cl.
*H02K 7/08* (2006.01)
*H02K 5/167* (2006.01)
*H02K 7/14* (2006.01)

(52) U.S. Cl.
CPC .............. *H02K 7/083* (2013.01); *H02K 5/1672* (2013.01); *H02K 7/14* (2013.01)

(58) Field of Classification Search
CPC ....................................................... H02K 7/08
USPC ........................................ 310/67 R, 90, 425
See application file for complete search history.

(56) References Cited

U.S. PATENT DOCUMENTS

| | | | | |
|---|---|---|---|---|
| 3,749,954 A * | 7/1973 | Anderson, Jr. | ....... | H02K 5/1677 310/90 |
| 4,682,065 A * | 7/1987 | English | ................. | F16C 35/04 310/156.26 |
| 5,834,870 A * | 11/1998 | Tokushima | ......... | F16C 33/1035 310/90 |
| 6,567,268 B1 * | 5/2003 | Hsieh | .................. | H02K 5/1675 310/90 |
| 7,332,841 B2 * | 2/2008 | Hsu | ......................... | H02K 7/14 310/261.1 |
| 8,322,930 B2 | 12/2012 | Li et al. | | |
| 8,435,018 B2 * | 5/2013 | Zhang | ................... | F04D 29/051 384/279 |

(Continued)

FOREIGN PATENT DOCUMENTS

KR    20-1998-0010647 U    5/1998
KR    10-2000-0050559 A    8/2000

(Continued)

*Primary Examiner* — Naishadh Desai
(74) *Attorney, Agent, or Firm* — Revolution IP, PLLC

(57) ABSTRACT

Disclosed therein is a fan motor including: a lower bracket having a lower protrusion which is located at the central portion and has a lower bearing insertion portion therein and a space which is formed around the lower protrusion; an upper bracket having an upper protrusion which is located at the central portion and has an upper bearing insertion portion therein; a rotor located between the lower protrusion and the upper protrusion and rotating together with a shaft; and a stator core surrounded by a lower insulator which is located above the lower protrusion and an upper insulator which is located below the upper protrusion.

5 Claims, 4 Drawing Sheets

(56) References Cited

U.S. PATENT DOCUMENTS

2004/0136842 A1* 7/2004 Obara .................. F04D 29/057 417/354
2008/0007127 A1* 1/2008 Hong .................. H02K 5/1675 310/51

FOREIGN PATENT DOCUMENTS

| KR | 10-2010-0027899 A | 3/2010 |
| WO | WO 2010-111902 A1 | 10/2010 |

* cited by examiner

FAN MOTOR

CROSS REFERENCE TO PRIOR APPLICATIONS

This application is a National Stage Application of PCT International Patent Application No. PCT/KR2012/008455 filed on Oct. 17, 2012, under 35 U.S.C. §371, which claims priority to Korean Patent Application No. 10-2011-0115945 filed on Nov. 8, 2011, which are all hereby incorporated by reference in their entirety.

TECHNICAL FIELD

The present invention relates to a fan motor, and more particularly, to a fan motor, which can prevent oil provided to a bearing of a motor rotating shaft from being spilled out, prevent moisture from being introduced into a printed circuit board inside a motor, and allow an easy assembling work.

BACKGROUND ART

In general, fan motors mean motors used for circulating fluids or forcedly sending air. In a case of the fan motor used in a refrigerator, such as a fridge, out of such fan motors, when moisture infiltrates into the fan motor, it may cause trouble or malfunction of electronic or mechanical parts inside the motor, and hence, it is very important to prevent infiltration of moisture.

Moreover, a bearing is used in order to rotatably support a rotary shaft of the fan motor to a bracket to rotate a fan, but it may cause a deterioration of productivity because it is very difficult to assemble the bearing to the bracket.

In the meantime, lubricating oil is supplied to the bearing in order to smoothly rotate the rotary shaft. A fixed quantity of the lubricating oil is stored in a felt, and then, is directly supplied to the bearing. In this instance, in order to prevent a leakage of oil to one end portion of the bearing, namely, in a direction of a rotor, an oil return washer is joined to the rotary shaft, and a conventional oil return washer is illustrated in FIGS. 7 and 8.

As shown in FIGS. 7 and 8, the conventional oil return washer 35' includes: a ring-shaped base ring 35a allowing the rotary shaft to penetrate through the center thereof; and a tubular small diameter part 35c connected integrally with the base ring 35a. The outer diameter of the base ring 35a is larger than that of the small diameter part 35c, and the rotary shaft of the motor penetrates through the small diameter part 35c and the base ring 35a. The small diameter part 35c and the base ring 35a are generally made of one of soft plastic materials.

The conventional oil return washer 35' has a problem in that oil spills toward the rotor of the center of the motor because oil flows toward the small diameter part 35c after going over the base ring 35a of the oil return washer along the surface of the bearing when the motor rotates at high speed. Accordingly, measures for preventing spill of oil are needed.

Accordingly, in order to solve the above problem, the inventors of the present invention propose a fan motor of a new structure, which has a news structure of an oil return washer and a space formed in a bracket for mounting a cover for a printed circuit board (PCB), makes an assembly of a bearing easy, and enhances assembly and productivity of the whole fan motor.

DISCLOSURE OF INVENTION

Technical Problem

Accordingly, the present invention has been made in an effort to solve the above-mentioned problems occurring in the prior arts, and it is an object of the present invention to provide a fan motor, which enhances assemblability through a new structure.

It is another object of the present invention to provide a fan motor, which can effectively protect a printed circuit board (PCT) from moisture.

It is a further object of the present invention to provide a fan motor, which can prevent that lubricating oil is spilled toward a rotor.

The above and other objects, features and advantages of the present invention will be apparent from the following detailed description of the preferred embodiments of the invention in conjunction with the accompanying drawings.

Solution to Problem

To achieve the above objects, the present invention provides a fan motor including: a lower bracket having a lower protrusion which is located at the central portion and has a lower bearing insertion portion therein and a space which is formed around the lower protrusion; an upper bracket having an upper protrusion which is located at the central portion and has an upper bearing insertion portion therein; a rotor located between the lower protrusion and the upper protrusion and rotating together with a shaft; and a stator core surrounded by a lower insulator which is located above the lower protrusion and an upper insulator which is located below the upper protrusion, wherein a lower bearing and an upper bearing are respectively pressed to the lower bearing insertion portion and the upper bearing insertion portion, and an upper oil return washer and a lower oil return washer each of which has a base ring and a pair of pillar parts are respectively joined to the upper bearing and the lower bearing.

In the present invention, a lower felt is joined around a lower portion of the lower bearing and an upper felt is joined around an upper portion of the upper bearing.

Moreover, the fan motor further includes: a fan joined to a portion of the shaft which protrudes upwardly from the central portion of the upper bracket, and the fan includes: a shaft insertion protrusion protruding at the central portion of the fan and having a shaft insertion portion formed therein; and at least one gap formed in the shaft insertion protrusion in a direction of the shaft.

In another aspect, the present invention provides a fan motor, which includes: a rotor joined with a rotary shaft, a stator opposed to the rotor, a housing surrounding the rotor and the stator, and a bearing joined to the housing and rotatably joined to the rotary shaft, the fan motor including an oil return washer having: a ring-shaped base ring allowing the rotary shaft to penetrate through the center thereof; and a pair of opposed pillar parts formed on the base ring in an axial direction, wherein the oil return washer is joined to one side of the bearing.

In the present invention, the oil return washer which is joined to one side of the bearing joined to a rotary shaft of a fan motor, includes: a ring-shaped base ring allowing the rotary shaft to penetrate through the center thereof; and a pair of opposed pillar parts formed on the base ring in an axial direction, wherein an inner distance between the opposed pillar parts is equal to an outer diameter of the rotary shaft, and an outer distance between the opposed pillar parts is shorter than an outer diameter of the base ring.

Advantageous Effects of Invention

The fan motor according to the present invention can enhance assemblability through the new structure, effectively protect the PCB inside the motor from moisture, and prevent spill of oil of the bearing.

MODE FOR THE INVENTION

Reference will be now made in detail to the preferred embodiment of the present invention with reference to the attached drawings.

Figure 1:
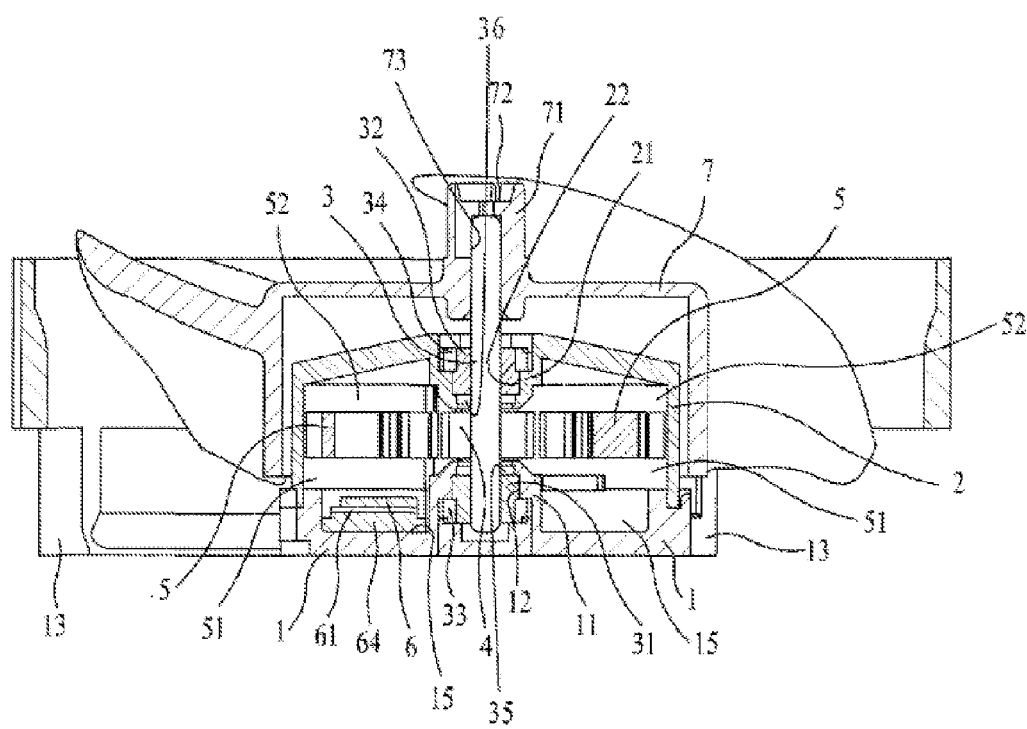
FIG. 1 is a sectional view showing a structure of a fan motor according to the present invention.

FIG. 1 is a sectional view showing a structure of a fan motor according to the present invention.

As shown in FIG. 1, the fan motor according to the present invention includes a lower bracket 1, an upper bracket 2, a shaft 3, a rotor 4, a stator core 5, a printed circuit board (PCB) cover 6, and a fan 7.

The lower bracket 1 together with upper bracket 2 serves to accommodate parts, such as the rotor 4 and the stator core 5, therein and isolate them from the outside. That is, the lower bracket 1 and the upper bracket 2 serve as a housing of a motor. Furthermore, the shaft 3 is located at the centers of the upper and lower brackets. In the present invention, the lower bracket 1 has a lower protrusion 11 formed upwardly at the central portion thereof, and a lower bearing insertion portion 12 formed inside the lower protrusion 11 in such a fashion that a lower bearing 31 is inserted thereinto. At an upper portion of the lower bearing 31 inside the lower protrusion 11, a lower oil return washer 35 is joined to the rotary shaft 3. The lower bearing insertion portion 12 has at least one stepped portion so that the lower bearing 31 is pressed and seated thereon. Preferably, a lower felt 33 for supplying oil to the lower bearing 31 may be located at a portion of the circumference of the lower bearing 31. In this instance, the stepped portion must be formed in consideration that the lower felt 33 is inserted into the lower bearing insertion portion 12. In the meantime, if it requires that the fan motor is manufactured in a box shape, the lower bracket 1 may be injection-molded in such a fashion that a box frame 13 is formed together when the lower bracket 1 is manufactured.

Like the lower bracket 1, the upper bracket 2 has an upper protrusion 21 which is formed at the central portion thereof and has an upper bearing insertion portion 22 formed therein for inserting an upper bearing 32 thereinto. At a lower portion of the upper bearing 32 inside the upper protrusion 21, an upper oil return washer 36 is joined to the rotary shaft 3. The upper bearing insertion portion 22 has at least one stepped portion so that the upper bearing 32 can be pressed and fixed. Preferably, an upper felt 34 for supplying oil to the upper bearing 32 may be located at a portion of the circumference of the upper bearing 32. In this instance, the stepped portion must be formed in such a fashion that the upper felt 34 is inserted into the upper bearing insertion portion 22. As described above, the lower and upper bearing insertion portions 22 are respectively formed in the lower and upper brackets 1 and 2 to thereby make insertion of the bearing easy.

In the present invention, the lower bracket 1 has an empty space 15 formed between the lower protrusion 11 of the center thereof and an outer peripheral wall of the bracket. The PCB cover 6 for protecting a PCB is located in the space 15 so as to effectively use the inside structure of the fan motor and to easily assemble the fan motor.

In the present invention, the shaft 3 is rotatably supported by the lower bearing 31 and the upper bearing 32. Additionally, the shaft 3 penetrates through the upper bracket 2 and protrudes upwardly from the upper bracket 2, and the fan 7 is joined to the protruding portion of the shaft 3.

The rotor 4 has a plurality of magnets (not shown) therein, is located between the lower bearing 31 and the upper bearing 32, and rotates together with the shaft 3. The rotor 4 is located inside the stator core 5.

A lower insulator 51 and an upper insulator 52 are respectively joined to a lower portion and an upper portion of the stator core 5. The lower insulator 51 is located above the lower protrusion 11 of the lower bracket 1, and the upper insulator 52 is located below the upper protrusion 21 of the upper bracket 2. The stator core 5 has a plurality of teeth (not shown) protruding to the inside of the center thereof, and each tooth is wound with a coil (not shown) in a state where the lower and upper insulators 51 and 52 are joined together.

Figure 2:
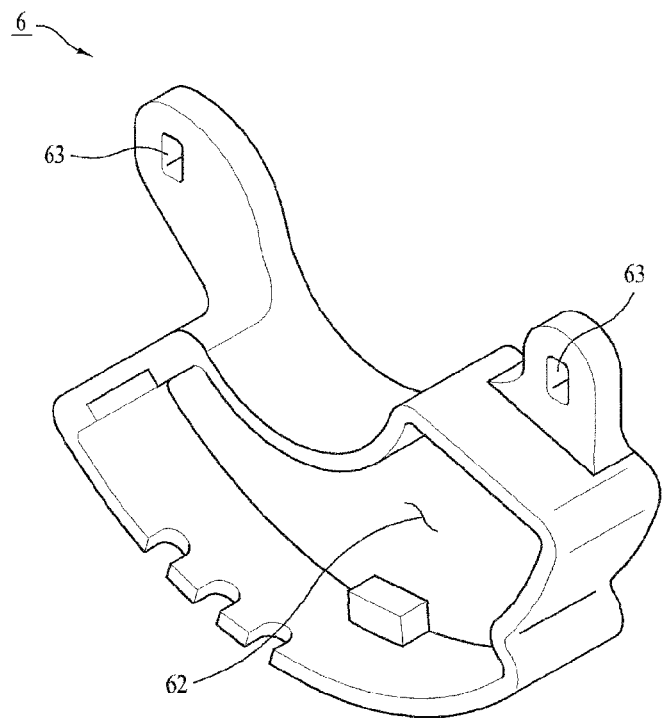
FIG. 2 is a perspective view of a PCB cover applied to the fan motor according to the present invention.
Figure 3:
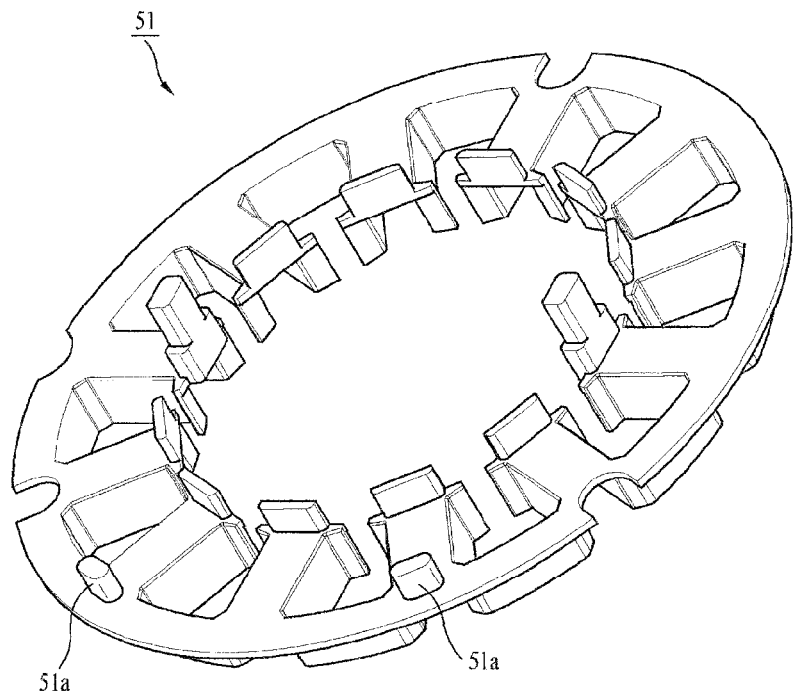
FIG. 3 is a perspective view of a lower insulator applied to the fan motor according to the present invention.

The PCB cover 6 is joined to the lower insulator 51 in such a way as to be located in the space 15 of the lower bracket 1. Referring to FIGS. 2 and 3, a detailed structure of the PCB cover 6 and a structure of the PCB cover 6 to be joined to the lower insulator 51 will be described.

FIG. 2 is a perspective view of a PCB cover applied to the fan motor according to the present invention, and FIG. 3 is a perspective view of a lower insulator applied to the fan motor.

As shown in FIG. 2, the PCB cover 6 according to the present invention has a PCB insertion space 62 for inserting a PCB 61 thereinto. The PCB 61 illustrated in FIG. 1 is located in the PCB insertion space 62, and the PCB insertion space 62 sealed through resin molding in a state where the PCB 61 is located in the PCB insertion space 62, such that a sealing portion 64 is formed. As described above, the PCB 61 is surrounded by the PCB cover 6 and the sealing portion 64, and hence, is protected from moisture infiltrated from the outside.

In the meantime, there is no limitation in the method that the PCB cover 6 is joined to the lower insulator 51, namely, the PCB cover 6 may be joined to the lower insulator 51 by adhesives or other joining means. FIGS. 2 and 3 illustrate that the PCB cover 6 has two joining holes 63 and the lower insulator 51 has two joining protrusions 51a. The two joining protrusions 51a are respectively joined to the joining holes 63, in the joined state, protruding portions of the joining protrusions 51a are melted to be firmly joined to the joining holes 63.

Figure 4:
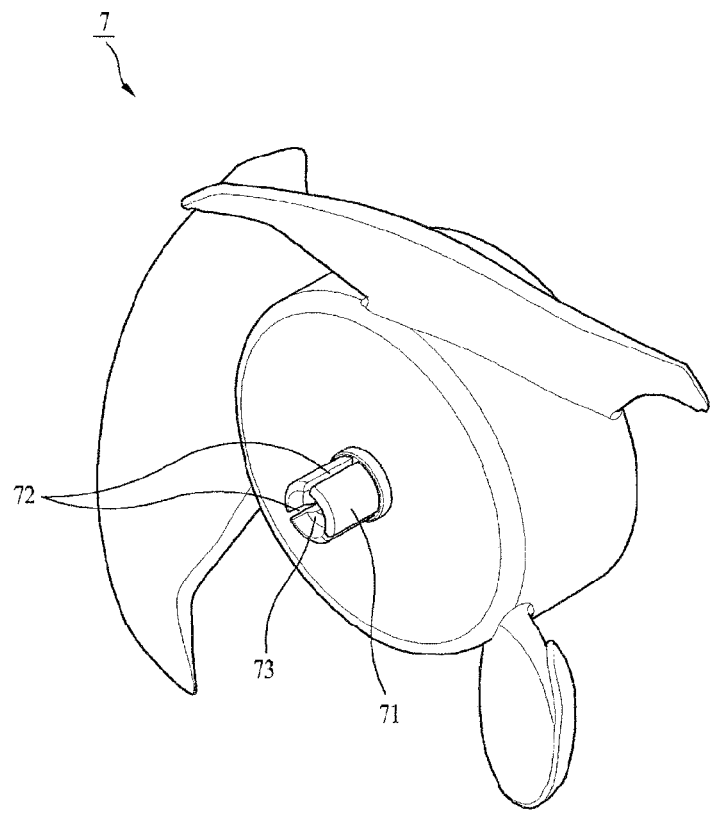
FIG. 4 is a perspective view of a fan applied to the fan motor according to the present invention.

FIG. 4 is a perspective view of a fan applied to the fan motor according to the present invention.

As shown in FIG. 4, the fan 7 includes: a shaft insertion protrusion 71 to which the shaft 3 is joined and fixed; and a shaft insertion portion 73 located inside the shaft insertion protrusion 71. Moreover, the shaft insertion protrusion 71 has at least one gap 72 formed in an axial direction. When the shaft 3 is located at the shaft insertion portion 73, the size of the gap 72 is reduced and the shaft insertion protrusion 71 presses the shaft 3 so that the fan is fixed to the shaft, using a fixing member, such as a compression spring or a fixing cap, to the shaft insertion protrusion 71. Through the above structure, the shaft and the fan can be simply assembled to thereby simplify the assembling process.

Figure 5:
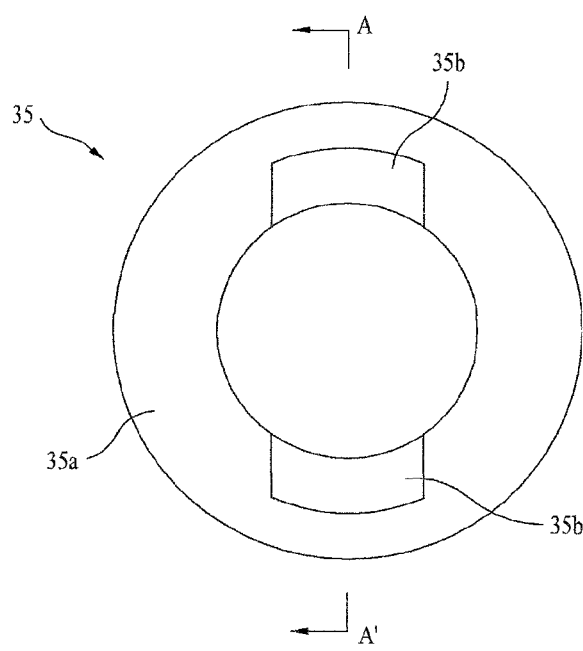
FIG. 5 is a plan view of an oil return washer applied to the fan motor according to the present invention.
Figure 6:
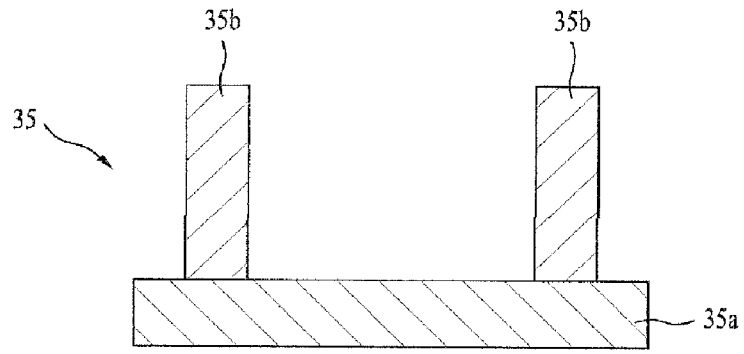
FIG. 6 is a sectional view taken along the line of A-A' of FIG. 5.
Figure 7:
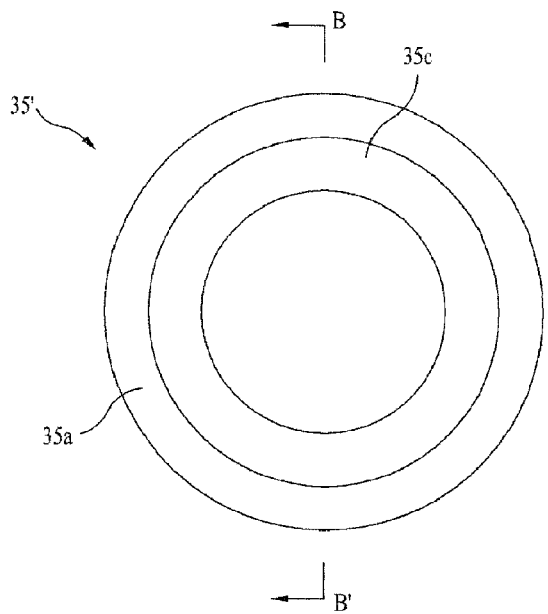
FIG. 7 is a plan view of the oil return washer applied to the fan motor according to the present invention.
Figure 8:
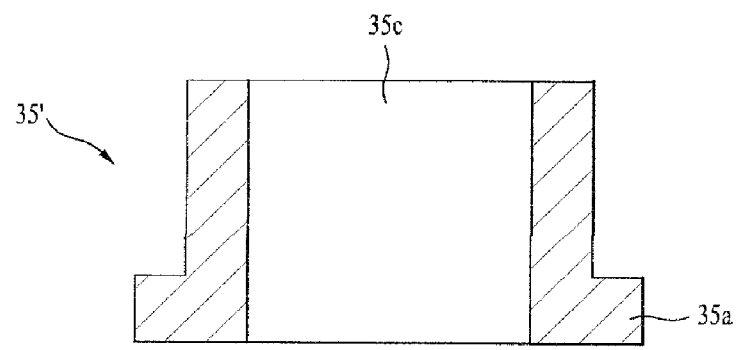
FIG. 8 is a sectional view taken along the line of B-B' of FIG. 7.

FIG. 5 is a plan view of an oil return washer applied to the fan motor according to the present invention, and FIG. 6 is a sectional view taken along the line of A-A' of FIG. 5.

The oil return washer 35 shown in FIGS. 5 and 6 means not only the lower oil return washer 35 of FIG. 1 but also the upper oil return washer 36. The two oil return washers 35 and 36 are made of the same material, and divided into the lower oil return washer 35 and the upper oil return washer 36 according to the mounted positions. Here, for convenience in description, they are called the oil return washer 35.

The oil return washer 35 includes: a base ring 35a having a central hole through which the rotary shaft 3 penetrates; and a pair of pillar parts 35b protruding in an axially longitudinal direction of the base ring 35a and opposed to each other. An inner straight distance between the opposed pillar parts 35b is equal to an inner diameter of the base ring 35a. In the meantime, an outer straight distance between the pillar parts 35b is shorter than an outer diameter of the base ring 35a. Meanwhile, it is preferable that the inner face of each pillar part 35b is in contact with the surface of the rotary shaft 3. Namely, the inner face of the pillar part 35b has the same curvature as the rotary shaft 3. When the shape of the oil return washer 35 is applied together with the bearing, when the bearing and the rotary shaft are rotated, it is prevented that oil flows and spills over the oil return washer 35.

While the present invention has been particularly shown and described with reference to the exemplary embodiment thereof, it will be understood by those of ordinary skill in the art that various changes in form and details may be made therein without departing from the spirit and scope of the present invention as defined by the following claims.

The invention claimed is:

1. A fan motor comprising:
   a lower bracket having a lower protrusion which is located at the central portion and has a lower bearing insertion portion therein and a space which is formed around the lower protrusion;
   an upper bracket having an upper protrusion which is located at the central portion and has an upper bearing insertion portion therein;
   a rotor located between the lower protrusion and the upper protrusion and rotating together with a shaft; and
   a stator core surrounded by a lower insulator which is located above the lower protrusion and an upper insulator which is located below the upper protrusion,
   wherein a lower bearing and an upper bearing are respectively pressed to the lower bearing insertion portion and the upper bearing insertion portion, and
   wherein an upper oil return washer and a lower oil return washer each of which has a base ring and a pair of pillar parts are respectively joined to the upper bearing and the lower bearing.

2. The fan motor according to claim 1, wherein a lower felt is joined around a lower portion of the lower bearing and an upper felt is joined around an upper portion of the upper bearing.

3. The fan motor according to claim 1, further comprising:
   a fan joined to a portion of the shaft which protrudes upwardly from the central portion of the upper bracket, wherein the fan comprises:
   a shaft insertion protrusion protruding at the central portion of the fan and having a shaft insertion portion formed therein; and
   at least one gap formed in the shaft insertion protrusion in a direction of the shaft.

4. A fan motor, which includes: a rotor joined with a rotary shaft, a stator opposed to the rotor, a housing surrounding the rotor and the stator, and a bearing joined to the housing and rotatably joined to the rotary shaft, the fan motor comprising:
   an oil return washer including:
   a ring-shaped base ring allowing the rotary shaft to penetrate through the center thereof; and
   a pair of opposed pillar parts formed on the base ring in an axial direction, wherein the oil return washer is joined to one side of the bearing.

5. Oil return washer which is joined to one side of the bearing joined to a rotary shaft of a fan motor, comprising:
   a ring-shaped base ring allowing the rotary shaft to penetrate through the center thereof; and
   a pair of opposed pillar parts formed on the base ring in an axial direction,
   wherein an inner distance between the opposed pillar parts is equal to an outer diameter of the rotary shaft, and an outer distance between the opposed pillar parts is shorter than an outer diameter of the base ring.

* * * * *